(12) United States Patent
Geinitz et al.

(10) Patent No.: US 10,438,018 B2
(45) Date of Patent: Oct. 8, 2019

(54) IDENTIFYING ONLINE SYSTEM USERS INCLUDED IN A GROUP GENERATED BY A THIRD PARTY SYSTEM WITHOUT THE THIRD PARTY SYSTEM IDENTIFYING INDIVIDUAL USERS OF THE GROUP TO THE ONLINE SYSTEM

(71) Applicant: Facebook, Inc., Menlo Park, CA (US)

(72) Inventors: Steven Richard Geinitz, London (GB); Nikhil Tarun Shah, Northwood (GB)

(73) Assignee: Facebook, Inc., Menlo Park, CA (US)

( * ) Notice: Subject to any disclaimer, the term of this patent is extended or adjusted under 35 U.S.C. 154(b) by 218 days.

(21) Appl. No.: 15/098,314

(22) Filed: Apr. 13, 2016

(65) Prior Publication Data

US 2017/0300718 A1  Oct. 19, 2017

(51) Int. Cl.
| | | |
|---|---|---|
| *G06F 7/04* | (2006.01) | |
| *G06F 17/30* | (2006.01) | |
| *H04N 7/16* | (2011.01) | |
| *G06F 21/62* | (2013.01) | |
| *H04L 29/06* | (2006.01) | |

(52) U.S. Cl.
CPC ...... *G06F 21/6254* (2013.01); *H04L 63/0428* (2013.01)

(58) Field of Classification Search
USPC .......................................................... 726/30
See application file for complete search history.

(56) References Cited

U.S. PATENT DOCUMENTS

| | | | | |
|---|---|---|---|---|
| 2012/0166272 A1* | 6/2012 | Wiley | ................ | G06Q 30/0246 705/14.45 |
| 2015/0088663 A1* | 3/2015 | Schechter | .......... | G06Q 30/0271 705/14.67 |
| 2015/0150075 A1* | 5/2015 | Vahlis | ................... | G06F 21/602 726/1 |

* cited by examiner

*Primary Examiner* — Jeffrey C Pwu
*Assistant Examiner* — Samuel Ambaye
(74) *Attorney, Agent, or Firm* — Fenwick & West LLP (57) ABSTRACT

A third party system generates a group of users and a function that identifies users in the group as well as additional users not in the group when applied to user identifying information. The third party system transmits the function to an online system, which applies the function to user identifying information associated with various users of the online system. Applying the function to the user identifying information generates a set of users including users in the group and one or more additional users who are not in the group. The online system transmits information associated with users in the set and information identifying users in the set to the third party system, which determines obtained information associated with users of the group. In some embodiments, the information identifying users in the set is obfuscated user identifying information associated with the users in the set by the online system.

20 Claims, 2 Drawing Sheets

IDENTIFYING ONLINE SYSTEM USERS INCLUDED IN A GROUP GENERATED BY A THIRD PARTY SYSTEM WITHOUT THE THIRD PARTY SYSTEM IDENTIFYING INDIVIDUAL USERS OF THE GROUP TO THE ONLINE SYSTEM

BACKGROUND

This invention relates generally to a third party system defining a group of users of an online system to the online system without disclosing the membership of the group to the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Third party systems also provide content to users. For example, a third party system provides one or more applications to users or provides web pages or other content for access to users. A third party system may identify groups of users who have accessed content provided by the third party or to whom the third party system presents content. Identifying groups of users allows a third party system to customize content provided to different users or to analyze how presentation of content to users affects actions performed by the users.

However, third party systems often maintain limited information about users, which may limit a third party system's ability to select content of interest to users or to evaluate how different users respond to content. Many third party systems exchange information with certain online system, such as social networking systems, subject to privacy settings or other restrictions on content sharing by different users of online systems, allowing a third party system to leverage information associated with users by online systems by providing an online system with user identifying information corresponding to the users. The online system retrieves stored information associated with the user identifying information and provides the retrieved information to the third party system, subject to privacy settings specified by the users. However, conventional methods for a third party system to obtain information associated with a group of users by an online system require the third party system to provide user identifying information associated with each user of the group. While this allows a third party system to leverage information associated with the group of users by the online system, it also allows the online system to reproduce the group, which may allow the online system to provide content to the group of users that competes with content from the third party system.

SUMMARY

A third party system provides content to various users, while an online system maintains information associated with the users. For example, the third party system provides web pages to users, services to users, applications to users, or any other suitable content to users. The online system maintains information associated with various users, and may also provide content to users. For example, the online system stores demographic information (e.g., location, age, gender, education history, etc.) associated with various users, stores actions performed by various users, stores connections between users and other users or between users and objects, or stores any suitable information associated with users.

The third party system generates a group of users and obtains information from the online system associated with users of the group. Based on the information from the online system, the third party system may select additional content for presentation to the users or evaluate actions performed by users of the group over a time interval. For example, the third party system generates a group by specifying user identifying information, such as electronic mail ("email") addresses, of users in the group. As an example, the third party system generates a group including email addresses of users who accessed a particular web page or who downloaded a particular application provided by the third party system 130. The third party system stores information identifying the group, such as an identifier of the group stored in association with user identifying information for users of the group (e.g., an email address of each user of the group). However, in various embodiments, while the third party requests information maintained by the online system for users of the group, the third party system desires to prevent the online system from ascertaining the composition of the group.

To obtain information maintained by the online system and associated with users of the group generated by the third party system without allowing the online system to reproduce the group, the third party system generates a function that is applied to user identifying information to identify users who are in the group as well as one or more additional users who are not in the group. For example, the function generates a value indicating inclusion in the group when applied to user identifying information corresponding to a user who is in the group; additionally, the function also generates the value indicating inclusion in the group when applied to user identifying information corresponding to certain additional users who are not in the group. However, the function generates a value indicating lack of inclusion in the group when applied to user identifying information corresponding to other users who are not in the group. Hence, the function produces some false positive values identifying certain users who are not in the group as included in the group, but does not produce false negative values identifying users who are in the group as not included in the group. For example, the function generated by the third party system is a bloom filter. However, any suitable function that generates values indicating inclusion in the group from user identifying information for all users who are included in the group and also from user identifying information for one or more users who are not included in the group may be used in various embodiments.

The third party system transmits the generated function to the online system, which applies the generated function to user identifying information associated with users by the online system. By applying the generated function to user identifying information associated with users by the online system, the online system generates a set of users that includes all users included in the group as well as one or more additional users who are not included in the group. The online system obtains information associated with each user in the set by the online system and transmits information identifying the set of users and the information associated with various users in the set (e.g., each user) to the third party system. For example, the online system obtains demographic information associated with each user in the set by the online system and transmits information identifying each user in the set to the third party system.

By comparing information identifying users of the set with information identifying the users of the group maintained by the third party system, the third party system identifies the group of users and determines information associated with users of the group from the information received from the third party system. For example, the third party system discards information received from the online system associated with user identifying information that does not correspond to user identifying information of a user of the group. Hence, the third party system obtains information associated with various users in the group by the online system without providing the online system with the membership of the group.

In various embodiments, the third party system and the online system obfuscate user identifying information. For example, the third party system obfuscates user identifying information and generates the function based on obfuscated user identifying information. The online system subsequently obfuscates user identifying information associated with users by the online system using the method of obfuscation used by the third party system to generate the set, and provides the obfuscated user identifying information for users of the set to the third party system. For example, the third party system applies a hash function to user identifying information (e.g., email addresses) and generate the function to determine whether a user is included in the group based on obfuscated user identifying information corresponding to the user. Alternatively, after generating the set by applying the function to user identifying information associated with users by the online system, the online system obfuscates user identifying information for users of the set and transmits obfuscated user identifying information for different users in the set to the third party system. In various embodiments, the third party system and the online system specify a method for obfuscating user identifying information, so the online system obfuscates user identifying information associated with users by the online system and applies the generated function to the obfuscated user identifying information associated with users by the online system to generate the set of users. When the online system transmits information identifying the set of users to the third party system, obfuscated user identifying information is transmitted by the online system, which prevents the third party system from identifying or extracting user identifying information used by the online system to identify various users in the set. Hence, the third party system may leverage information maintained by the online system for users of the group generated by the third party system without providing information to the online system that allows the online system to locally generate the group, while obfuscating user identifying information prevents the third party system from receiving information used by the online system to identify various users.

BRIEF DESCRIPTION OF THE DRAWINGS

FIG. 2 is a block diagram of an online system, in accordance with an embodiment of.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
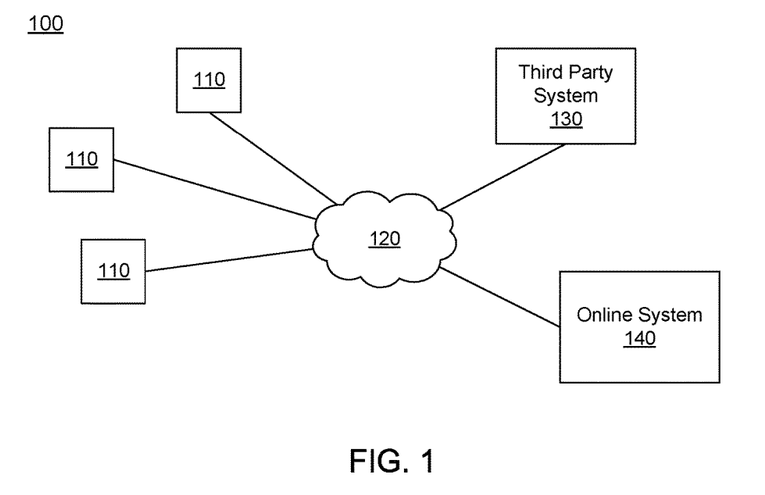
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROIDT™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

In some embodiments, a third party system 130 generates a group of users, and may obtain information from the online system 140 maintained by the group of users. For example, the third party system 130 generates a group by specifying user identifying information, such as electronic mail ("email") addresses, of users in the group to obtain information associated with users of the group maintained by the online system 140. As an example, the third party system 130 generates a group including email addresses of users who accessed a particular web page or who downloaded a particular application provided by the third party system 130. However, in various embodiments, the third party system 130 desires to prevent the online system 140 from identifying users of the group, while obtaining information about the users of the group from the online system 140 to improve additional content provided to the users of the group by the third party system 130.

To obtain information maintained by the online system 140 and associated with users of the group generated by the third party system 130 without identifying users who are in the group to the online system 140, the third party system 130 generates a function that is applied to user identifying information to identify users who are in the group as well as one or more additional users who are not in the group. For example, the function generates a value indicating inclusion in the group when applied to user identifying information corresponding to a user who is in the group; however, the function also generates the value indicating inclusion in the group when applied to user identifying information corresponding to certain additional users who are not in the group, but generates a value indicating lack of inclusion in the group when applied to user identifying information corresponding to other users who are not in the group. Hence, the function produces some false positive values that identify certain users who are not in the group as included in the group, but does not produce false negative values that identify users who are in the group as not included in the group. For example, the function generated by the third party system 130 is a bloom filter. However, any suitable function that generates values indicating inclusion in the group from user identifying information for all users who are included in the group and also from user identifying information for one or more users who are not included in the group may be used in various embodiments.

As further described below in conjunction with FIG. 3, the third party system 130 transmits the generated function to the online system 140, which applies the generated function to user identifying information associated with users by the online system 140. By applying the generated function to user identifying information associated with users by the online system 140, the online system 140 generates a set of users that includes all users included in the group as well as one or more additional users who are not included in the group. The online system 140 obtains information associated with each user in the set by the online system 140 and transmits information identifying the set of users and the information associated with each user in the set to the third party system 130. By comparing information identifying users of the set with information identifying the users of the group maintained by the third party system 130, the third party system 130 identifies the group of users and determines information associated with users of the group from the information received from the third party system 130. For example, the third party system 130 discards information received from the online system 140 associated with user identifying information that does not correspond to user identifying information of a user of the group.

The third party system 130 may obfuscate user identifying information and generate the function based on the obfuscated user identifying information. For example, the third party system 130 applies a hash function to user identifying information (e.g., email addresses) and generate the function to determine whether a user is included in the group based on obfuscated user identifying information corresponding to the user. In various embodiments, the third party system 130 and the online system 140 specify a method for obfuscating user identifying information, so the online system 140 obfuscates user identifying information associated with users by the online system 140 and applies the generated function to the obfuscated user identifying information associated with users by the online system 140 to generate the set of users. When the online system 140 transmits information identifying the set of users to the third party system 130, obfuscated user identifying information is transmitted by the online system 140, which prevents the third party system 130 from identifying or extracting user identifying information used by the online system 140 to identify various users in the set.

Figure 2:
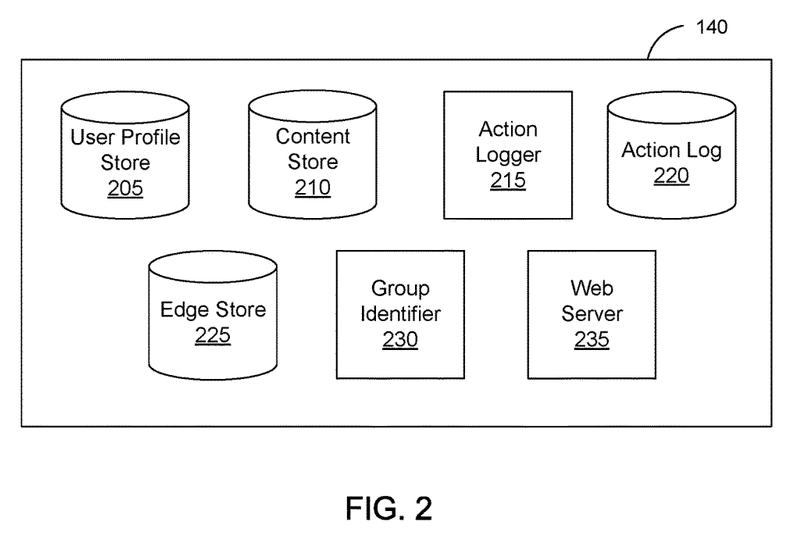

FIG. 2 is a block diagram of an architecture of the online system 140. The online system 140 shown in FIG. 2 includes a user profile store 205, a content store 210, an action logger 215, an action log 220, an edge store 225, a group identifier 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group identifier 230 receives a function generated by a third party system 130 and associated with a group generated by the third party system 130 and applies the function to user identifying information associated with various users by the online system 140. As described above in conjunction with FIG. 1, when applied to user identifying information, the function generates an indication a user corresponding to the user identifying information is included in the group or an indication the user corresponding to the user identifying information is not included in the group. Additionally, the function generates the indication a user is included in the group when applied to user identifying information corresponding to one or more users who are not in the group. Hence, the function produces some false positive values that identify certain users who are not in the group as included in the group, but does not produce false negative values that identify users who are in the group as not included in the group.

By applying the received function to user identifying information associated with users by the online system 140, the group identifier 230 generates a set of users that includes users corresponding to user identifying information that caused the received function to generate an indication the users are included in the group. Because the received function generates indications of inclusion in the group for one or more users who are not in the group, the set generated by the group identifier 230 includes users who are in the group as well as one or more additional users who are not in the group. The group identifier 230 may apply the function to any suitable information in user profiles for various users that is capable of uniquely identifying different users. For example, the group identifier 230 applies the function to electronic mail ("email") addresses included in various user profiles from the user profile store, and generates the set by identifying email addresses for which the function generated the indication of inclusion in the group.

For various users in the set, the group identifier 230 obtains information associated with the users from the user profile store 205, the action log 220, the edge store 225, or any other suitable source. In some embodiments, the group identifier 230 obtains information associated with each user of the set from one or more of the user profile store 205, the action log 220, and the edge store 225. The obtained information may be identified by the third party system 130 from which group identifier 230 received the function, allowing the third party system to customize the information obtained for users of the set. Information associated with users in the set and retrieved by the group identifier 230 may be demographic information included in user profiles associated with users of the set from the user profile store 205, actions performed by users of the set from the action log 220, connections between users of the set and other users or objects from the edge store 225, content items presented to users of the set from the content store 210 and from the action log 220, or any other suitable information.

The obtained information and information identifying each user of the set is communicated to the third party system 130. In various embodiments, the group identifier 230 obfuscates user identifying information associated with each user of the set by the online system 140 and transmits the obfuscated user identifying information associated with each user of the set by the online system 140 along with obtained information associated with various obfuscated user identifying information. Obfuscating the user identifying information associated with different users of the set by the online system 140 allows the group identifier 230 to provide information associated with users of the group while preventing the third party system 130 from obtaining user identifying information associated with users of the set by the online system 140. Identifying the set of users and transmitting information associated with users of the set of users is further described below in conjunction with FIG. 3

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
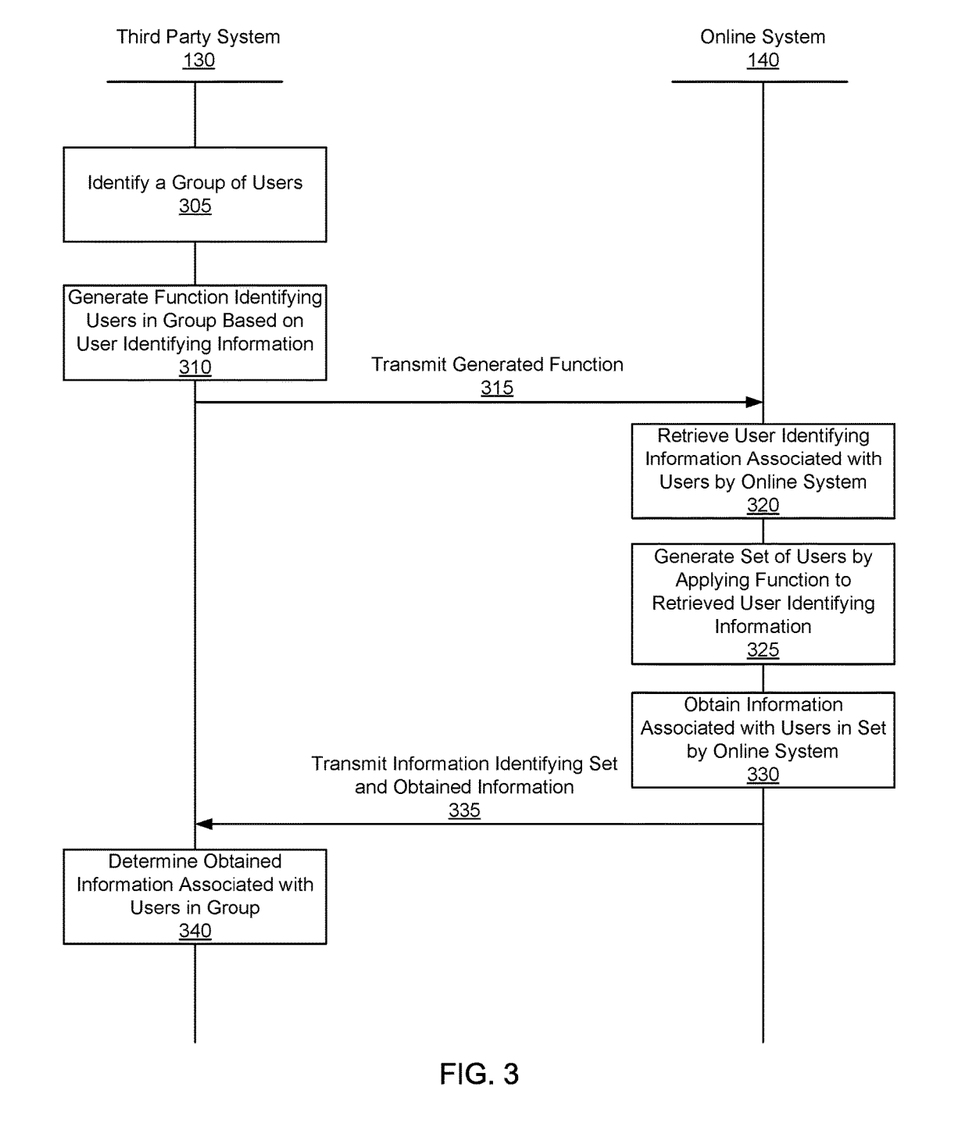
FIG. 3 is an interaction diagram of a method for an online system to identify users of the online system included in a group identified by a third party system without the third party system identifying the group to the online system, in accordance with an embodiment.

Identifying Online System Users Included in a Group Specified by a Third Party System FIG. 3 is an interaction diagram of a method for an online system 140 to identify users of the online system 140 included in a group identified by a third party system 130 without the third party system 130 identifying the group to the online system 140. In various embodiments, the method may include different or additional steps than those described in conjunction with FIG. 3. Additionally, in some embodiments, steps of the method may be performed in different orders than the order described in conjunction with FIG. 3.

A third party system 130 generates 305 a group of users of the third party system 130. For example, the third party system 130 generates 305 the group by specifying user identifying information, such as electronic mail ("email") addresses (or any other information capable of uniquely identifying users), of users of the third party system 130. As an example, the third party system 130 generates 305 a group including email addresses of users who accessed a particular web page or who downloaded a particular application provided by the third party system 130. In another example, the third party system 130 identifies user identifying information associated with various users who have requested content from the third party system 130.

In various embodiments, the third party system 130 communicates with an online system 140 that maintains information associated with users of the online system 140. For example, as described above in conjunction with FIG. 2, the online system 140 maintains demographic information associated with various users of the online system 140, information describing actions performed by users of the online system 140, connections between users of the online system 140 and other users or objects of the online system 140, content provided to users of the online system 140, or any other suitable information. The online system 140 may provide the third party system 130 with certain information associated with users by the online system 140, subject to privacy settings or constraints on distribution of information by the users of the online system 140. Based on information associated with users by the online system 140, the third party system 130 may select content for the users or tailor communications to the users. Hence, the third party system 130 may leverage information associated with users of the group by the online system 140 to subsequently provide content to users of the group or identify characteristics of users of the group to evaluate interactions with content or applications provided or promoted by the third party system 130. However, in various embodiments, the third party system 130 desires to prevent the online system 140 from identifying the group itself, while obtaining information about the users of the group from the online system 140.

To obtain information associated with users of a group maintained by the online system 140 without identifying the makeup of the group to the online system 140, the third party system 130 generates 310 a function that is applied to user identifying information to identify users who are in the group and also one or more additional users who are not in the group. For example, the function generates a value indicating inclusion in the group when applied to user identifying information corresponding to a user who is in the group, but also generates the value indicating inclusion in the group when applied to user identifying information corresponding to certain additional users who are not in the group. When the function is applied to user identifying information corresponding to other users who are not in the group, the function generates a value indicating lack of inclusion in the group. Hence, the function produces some false positive values that identify certain users who are not in the group as included in the group, but does not produce false negative values that identify users who are in the group as not included in the group. In various embodiments, the third party system 130 specifies a number of false positive values produced by the function by specifying various parameters of the function. As an example, the third party system 130 determines a specific rate to produce false positive values and selects one or more parameters for the function to produce the false positive values at the specific rate. For example, the function generated by the third party system 130 is a bloom filter. If the function is a bloom filter, the third party system 130 determines a length of a bit array comprising the bloom filter and a number of indices for including a user in the bit array (or for determining whether a user is in the bit array) to specify a rate at which the function produces false positive values indicating users who are not in the group are included in the group and generates 310 the bloom filter based on the determined length of the bit array and the determined number of indices, resulting a bloom filter producing false positive values at the specified rate. However, the third party system 130 may generate 310 any suitable function that generates values indicating inclusion in the group from user identifying information for all users who are included in the group and also from user identifying information for one or more users who are not included in the group in various embodiments. The third party system 130 may determine various parameters of a function so the function provides a specific rate of false positives, similar to determination of parameters for the bloom filter described above, and generate 310 the function having the determined parameters.

In some embodiments, the third party system 130 may obfuscate user identifying information and generate 310 the function based on the obfuscated user identifying information. For example, the third party system 130 applies a hash function to user identifying information (e.g., email addresses) to obfuscate the user identifying information and generates 310 the function determining whether a user is included in the group based on obfuscated user identifying information corresponding to the user. However, the third party system 130 may use any suitable method to obfuscate user identifying information in various embodiments.

The third party system 130 transmits 315 the generated function to the online system 140, which retrieves 320 user identifying information associated with users by the online system 140. For example, the online system 140 retrieves 320 email addresses associated with users by the online system 140. The online system 140 generates 325 a set of users by applying the function received from the third party system 130 to the user identifying information associated with users by the online system 140. Because the function received from the third party system 130 identifies one or more users who are not in the group, the set generated by the online system 140 includes all users in the group as well as one or more additional users who are not in the group. In embodiments where the third party system 130 obfuscates user identifying information when generating 310 the function, the online system 140 obfuscates the user identifying information associated with users by the online system 140 and generates 325 the set by applying the function to the obfuscated user identifying information associated with users by the online system 140. For example, the third party system 130 transmits the method for obfuscating user identifying information associated with users by the online system 140 when the function is transmitted 315 to the online system 140. As an example, if the third party system 130 applies a hash function to the user identifying information, the third party system 130 transmits an identifier of the hash function or the hash function to the online system 140 along with the generated function; hence, the online system 140 and the third party system 130 obfuscate user identifying information using the same hash function or other method for obfuscating user identifying information. In other embodiments, the online system 140 and the third party system 130 communicate with each other to identify a method for obfuscating user identifying information (e.g., a hash function) prior to the online system 140 receiving the function or after the online system 140 receives the function. Because the set generated 325 by the online system 140 applying the function to user identifying information associated with users by the online system 140 includes one or more users who are not in the group of users identified 305 by the third party system 130, the composition of the group is obfuscated from the online system 140.

From information associated with users by the online system 140, the online system 140 obtains 330 information associated with one or more users in the set and transmits 335 information identifying the set and the obtained information associated with users in the set to the third party system 130. For example, the online system 140 obtains 330 information associated with each user in the set, subject to privacy settings or restrictions associated with each user in the set by the online system 140, from data stored by the online system 140 and transmits 335 the obtained information in association with information identifying users in the set to the third party system 130. In various embodiments, the online system 140 obtains 330 demographic information associated with different users of the set from user profiles maintained for the users of the set by the online system 140, one or more actions performed by different users of the set (e.g., specific types of actions performed by users of the set, actions performed by users of the set within a particular time interval, actions performed by users of the set associated with specific other users or with specific objects, etc.), connections between users of the set and one or more additional users or objects, or any other suitable information. The third party system 130 may specify the information for the online system 140 to obtain 330 when transmitting 315 the function to the online system 140. Alternatively, the third party system 130 identifies information to obtain 330 to the online system 140 prior to transmitting 315 the function to the online system 140, and the online system 140 stores information identifying the information to obtain 330 in association with an identifier of the third party system 130. In other embodiments, the third party system 130 requests particular information for the online system 140 to obtain after transmitting 315 the function to the online system 140.

The online system 140 transmits 335 information identifying the set of users and the obtained information associated with different users in the set to the third party system 130. For example, the online system 140 transmits user identifying information associated with each user in the set and obtained information corresponding to each user. As an example, the online system 140 transmits 335 demographic information associated with each user in the set in association with user identifying information corresponding to each user in the set.

In various embodiments, the online system 140 obfuscates user identifying information associated with each user in the set by the online system 140 and transmits 335 the obfuscated user identifying information associated with users in the set by the online system 140 to the third party system 130 to identify the set of users. For example, the online system 140 applies a hash function provided by the third party system 130 to the online system 140 to the user identifying information associated with different users in the set by the online system 140 to obfuscate the user identifying information associated with different users in the set by the online system 140. As further described above, the online system 140 and the third party system 130 may communicate with each other at any suitable time to determine a method for obfuscating user identifying information common to the third party system 130 and to the online system 140 (e.g., a hash function known to the online system 140 and to the third party system 130). Obfuscating user identifying information associated with each users in the set by the online system 140 and transmitting 335 obfuscated user identifying information to the third party system 130 to identify the set prevents the third party system 130 from identifying or extracting user identifying information used by the online system 140 to identify various users in the set from the transmitted information.

By comparing the received information identifying users of the set with information identifying the users of the group maintained by the third party system 130, the third party system 130 identifies the group of users and determines 340 information associated with users of the group from the information received from the third party system 130. For example, the third party system 130 compares user identifying information for each user of the group maintained by the third party system 130 with user identifying information in the received information identifying users of the set generated by the online system 140 and discards information received from the online system 140 associated with user identifying information that does not correspond to user identifying information of a user of the group maintained by the third party system 130. In embodiments where the online system 140 obfuscates user identifying information associated with users in the set, the third party system 130 obfuscates user identifying information associated with users in the group using a common obfuscation method as the online system 140 and discards information received from the online system 140 associated with obfuscated user identifying information in the received information that does not match obfuscated user identifying information maintained by the third party system 130 to identify 305 the group. For example, the third party system 130 applies a hash function to email addresses maintained by the third party system 130 and associated with users of the group and compares the hashed email addresses to hashed email addresses included in received information identifying the set of users from the online system 140; the third party system 140 discards information received from the online system 140.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, from a third party system, a function generated by the third party system that identifies users in a group based on user identifying information and identifies at least one other user who is not included in the group;
retrieving user identifying information associated with users by an online system;
generating a set of users at the online system by applying the function to the user identifying information associated with users by the online system, the set including users included in the group and one or more additional users who are not included in the group;
obtaining information associated with each user of the set of users maintained by the online system;
obfuscating user identifying information associated with users of the set by the online system; and
transmitting the obfuscated user identifying information associated with each user of the set by the online system and obtained information associated with each user of the set of users from the online system to the third party system.

2. The method of claim 1, wherein obfuscating user identifying information associated with users of the set by the online system comprises:
applying a hash function to user identifying information associated with each user of the set by the online system.

3. The method of claim 2, wherein receiving, from the third party system, the function generated by the third party system that identifies users in the group based on user identifying information and identifies at least one other user who is not included in the group comprises:
receiving the hash function and the function generated by the third party system from the third party system.

4. The method of claim 1, wherein the function generated by the third party system generates values indicating inclusion in the group for all users who are included in the group and for one or more users who are not included in the group based on user identifying information.

5. The method of claim 4, wherein the function generated by the third party system comprises a bloom filter.

6. The method of claim 1, wherein user identifying information associated with users by the online system comprises electronic mail ("email") addresses associated with users by the online system.

7. The method of claim 6, wherein obfuscating user identifying information associated with users of the set by the online system comprises:
applying a hash function to email addresses associated with each user of the set by the online system.

8. The method of claim 1, wherein obtaining information associated with each user of the set of users maintained by the online system comprises:
obtaining demographic information associated with each user of the set of users by the online system.

9. The method of claim 1, wherein obtaining information associated with each user of the set of users maintained by the online system comprises:
obtaining one or more actions performed by each user of the set of users by the online system and identified by the online system.

10. The method of claim 1, wherein obtaining information associated with each user of the set of users maintained by the online system comprises:
obtaining connections between each user of the set of users and one or more other users of the online system.

11. The method of claim 1, wherein receiving, from the third party system, the function generated by the third party system that identifies users in the group based on user identifying information and identifies at least one other user who is not included in the group comprises:
receiving the function generated by the third party system and a specification of information for the online system to obtain.

12. The method of claim 11, wherein obtaining information associated with each user of the set of users maintained by the online system comprises:
obtaining the specified information associated with each user of the set of users maintained by the online system.

13. A method comprising:
identifying a group of users at a third party system;
generating a function that identifies users in the group based on user identifying information and identifies at least one other user who is not included in the group;
transmitting the function to an online system that maintains information associated with various users;
receiving information from the online system identifying a set of users that includes all users in the group and one or more additional users who are not in the group and including information associated with each user in the set of users by the online system; and
determining information associated with users in the group of users from the received information.

14. The method of claim 13, wherein the function generates values indicating inclusion in the group for all users who are included in the group and for one or more users who are not included in the group based on user identifying information.

15. The method of claim 14, wherein the function comprises a bloom filter.

16. The method of claim 13, wherein determining information associated with users in the group of users from the received information comprises:
determining user identifying information associated with users in the set from the received information that matches user identifying information associated with users in the group.

17. The method of claim 13, wherein receiving information from the online system identifying the set of users comprises:

receiving obfuscated user identifying information associated with each user of the set of users by the online system.

18. The method of claim 17, wherein determining information associated with users in the group of users from the received information comprises:

obfuscating user identifying information associated with users of the group by the third party system using a method for obfuscating used by the online system to generated the obfuscated user identifying information associated with each user of the set of users by the online system; and determining obfuscated user identifying information associated with users of the set of users by the online system in the received information that matches obfuscated user identifying information associated with users in the group by the third party system.

19. A computer program product comprising a non-transitory computer readable storage medium having instructions encoded thereon that, when executed by a processor, cause the processor to:

receive, from a third party system, a function generated by the third party system that identifies users in a group based on user identifying information and identifies at least one other user who is not included in the group;

retrieve user identifying information associated with users by an online system;

generate a set of users at the online system by applying the function to the user identifying information associated with users by the online system, the set including users included in the group and one or more additional users who are not included in the group;

obtain information associated with each user of the set of users maintained by the online system;

obfuscate user identifying information associated with users of the set by the online system; and transmit the obfuscated user identifying information associated with each user of the set by the online system and obtained information associated with each user of the set of users from the online system to the third party system.

20. The computer program product of claim 19, wherein the function generated by the third party system generates values indicating inclusion in the group for all users who are included in the group and for one or more users who are not included in the group based on user identifying information.

* * * * *